(12) United States Patent
Sakaguchi

(10) Patent No.: US 11,829,654 B2
(45) Date of Patent: Nov. 28, 2023

(54) SYSTEM, SERVER SYSTEM, AND PRINT CONTROL METHOD USING SERVER SYSTEM FOR EXECUTING PRINTING BY USING PRINT CODE

(71) Applicant: CANON KABUSHIKI KAISHA, Tokyo (JP)

(72) Inventor: Mayato Sakaguchi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/821,086

(22) Filed: Aug. 19, 2022

(65) Prior Publication Data

US 2023/0061479 A1 Mar. 2, 2023

(30) Foreign Application Priority Data

Aug. 25, 2021 (JP) ................. 2021-137287

(51) Int. Cl.
*G06F 3/12* (2006.01)
(52) U.S. Cl.
CPC .......... *G06F 3/1205* (2013.01); *G06F 3/1227* (2013.01); *G06F 3/1287* (2013.01)
(58) Field of Classification Search
CPC ..... G06F 3/1205; G06F 3/1227; G06F 3/1287
USPC ....................................... 358/1.15
See application file for complete search history.

(56) References Cited

U.S. PATENT DOCUMENTS

| 2008/0225334 A1* | 9/2008 | Hamada | G06F 3/1268 |
| | | | 358/1.15 |
| 2012/0038940 A1* | 2/2012 | Boskovic | G06F 3/1206 |
| | | | 358/1.15 |
| 2021/0042072 A1* | 2/2021 | Nagano | G06F 3/129 |

FOREIGN PATENT DOCUMENTS

JP 2016062482 A 4/2016

* cited by examiner

*Primary Examiner* — Allen H Nguyen
(74) *Attorney, Agent, or Firm* — Canon U.S.A., Inc., IP Division

(57) ABSTRACT

A system includes a printer and a server system in which registration of print data to be printed by a printer is performed. The server system includes a reception unit that receives a first message, which is transmitted from a message app operating in a client terminal to request the registration of the print data, via a message app server, a first transmission unit that transmits, in response to the message, a URL of a registration form of the print data to the message app via the message app server, a registration unit that registers the print data, which is transmitted by a browser operating in the client terminal by using the registration form, and a second transmission unit that transmits a print code corresponding to the print data to the message app via the message app server. The printer then executes printing based on the registered print data.

11 Claims, 16 Drawing Sheets

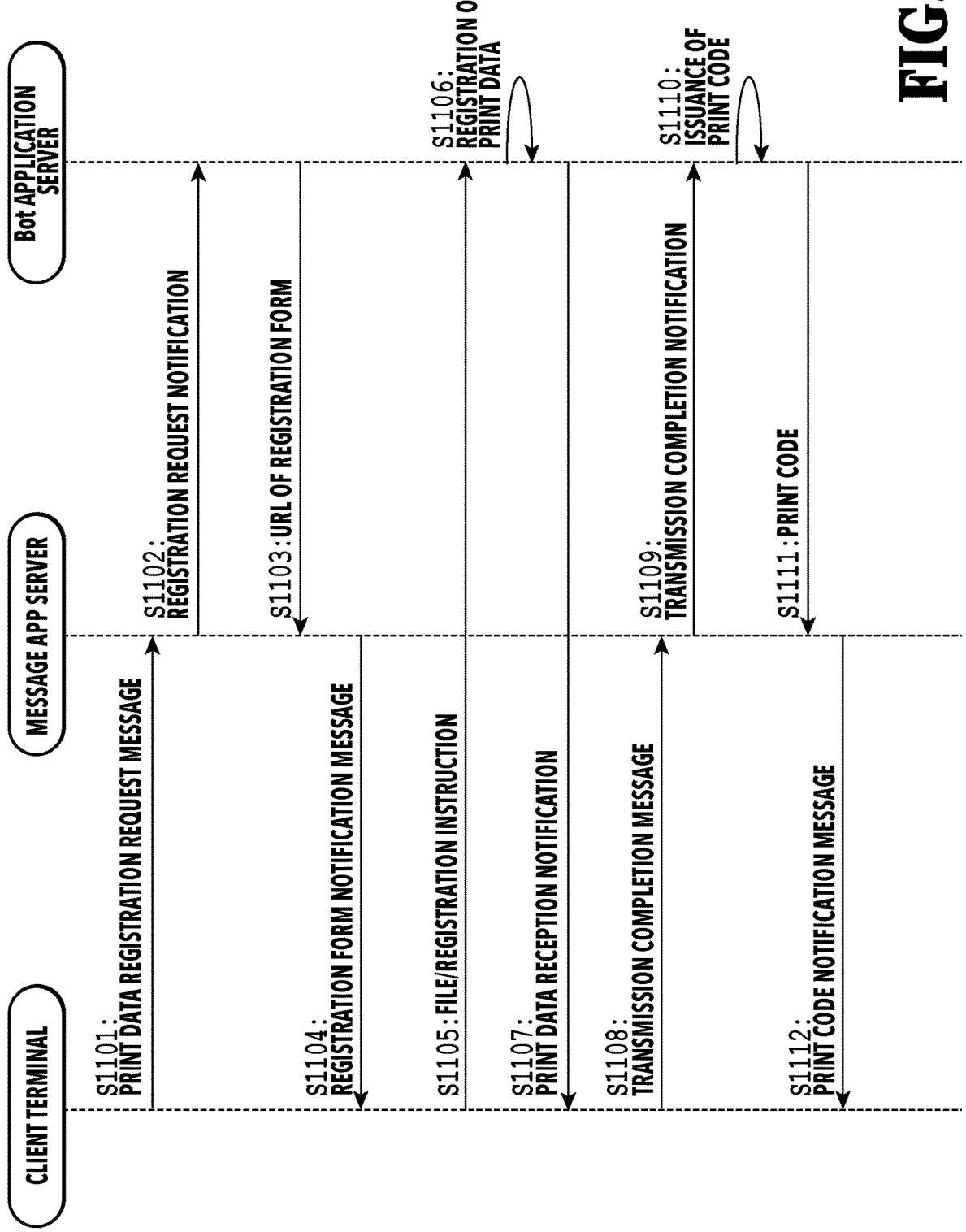

SYSTEM, SERVER SYSTEM, AND PRINT CONTROL METHOD USING SERVER SYSTEM FOR EXECUTING PRINTING BY USING PRINT CODE

BACKGROUND

Field

The present disclosure relates to a technique of print control using a message application.

Description of the Related Art

There has been widely used a messaging application (hereinafter referred to as a "message app") for exchanging messages between multiple user terminals via a network. This is exchange of messages is more commonly referred to as "chatting". There has also been an increase in services to print a file with a print device connected to a network, where the file to be printed is transmitted by a user using the above-described message app. Japanese Patent Laid-Open No. 2016-062482 (hereinafter, referred to as PTL 1) discloses a technique in which a print service server issues a code for printing a file transmitted to the message app. A user can print the file from a printing apparatus by inputting the code to the printing apparatus.

In the technique of PTL 1, printing is performed by using image data submitted to the message app. This results in printing being performed under a restriction in the message app, such as downsizing of the image data.

SUMMARY

A system according to an aspect of the present disclosure includes a printer and a server system in which registration of print data to be printed by the printer is performed, wherein the server system includes a reception unit configured to receive a first message, which is transmitted from a messaging application operating in a client terminal to request the registration of the print data, via a messaging application server, a first transmission unit configured to, in response to the message, transmit a uniform resource locater (URL) of a registration form of the print data to the messaging application via the messaging application server, a registration unit configured to register the print data, which is transmitted by a browser operating in the client terminal by using the registration form, and a second transmission unit configured to transmit a print code corresponding to the print data to the messaging application via the messaging application server, wherein the printer executes printing based on the registered print data.

Further features will become apparent from the following description of exemplary embodiments with reference to the attached drawings.

BRIEF DESCRIPTION OF THE DRAWINGS

FIG. 11 is a sequence diagram of processing of registering the print data;

DESCRIPTION OF THE EMBODIMENTS

Exemplary embodiments of the present disclosure are described below in detail with reference to the appended drawings. The following embodiments are not intended to limit the matters of the present disclosure, and not all the combinations of the characteristics described in the present embodiments are necessarily required for implementing the embodiments.

<System Configuration>

Figure 1:
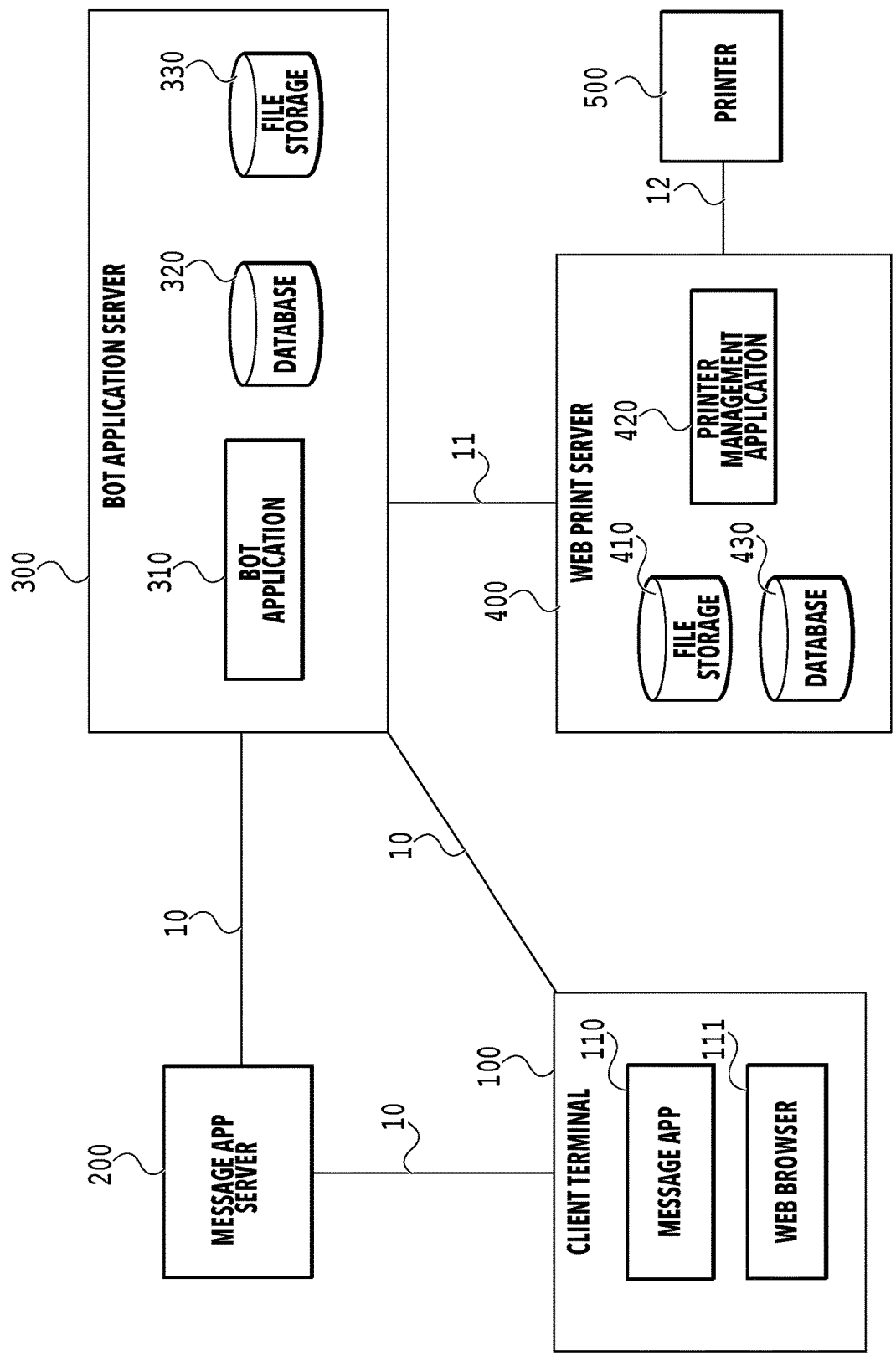
FIG. 1 is a diagram illustrating an example of a configuration of a print system.

FIG. 1 is a diagram illustrating an example of a configuration of a print system according to a first embodiment of the present embodiment. The print system illustrated in FIG. 1 includes a client terminal 100, a message app server 200, a Bot application server 300, a Web print server 400, and a printer 500.

The client terminal 100 includes a message app 110 and a Web browser 111. The Bot application server 300 includes a Bot application 310, a database 320, and a file storage 330. The Web print server 400 includes a file storage 410, a printer management application 420, and a database 430.

An example in which the Bot application server 300 cooperates with the message app 110 and the Web print server 400 will be described with reference to FIG. 1. A configuration of a system in which the Bot application server 300 provides an instruction as a print job to the printer 500 via the Web print server 400 to print a file, such as an image or a document transmitted from the client terminal 100, will also be described.

In FIG. 1, the client terminal 100, the message app server 200, and the Bot application server 300 are connected to each other via a network 10. The Bot application server 300 and the Web print server 400 are connected to each other via a network 11. The Web print server 400 and the printer 500 are connected to each other via a network 12. The number of client terminals 100 or printers 500 is not limited to the example illustrated in FIG. 1, and any number of client terminals 100 and printers 500 that would enable implementation of the present embodiment is applicable.

The networks 10, 11, and 12 can be, for example, a LAN, a WAN such as the Internet, a telephone line, or a dedicated digital line. The networks 10, 11, and 12 can also be an ATM, a frame relay line, a cable television line, a wireless line for data broadcast, or the like. The networks 10, 11, and 12 can be implemented by any combination of the above. The networks 10, 11, and 12 can be any type of communication network that would support transmitting and receiving data. The networks 10, 11, and 12 can be networks different from each other or can have a configuration using the same network.

The message app 110 included in the client terminal 100 is a messaging application for exchanging messages between multiple user terminals via a network, i.e., "chatting". The message app 110 accepts an operation by the user and transmits a message or a file inputted by the operation to the message app server 200 via the network 10. The message app 110 notifies the user of a message received from the message app server 200 via the network 10. In addition to the exchanging of messages between users via the message app server 200, the message app 110 can exchange messages with the Bot application 310 via the message app server 200.

As described above, the client terminal 100 includes the Web browser 111, which is an application for displaying a Web page. The Web browser 111 displays a Web page provided by the Bot application 310 in the Bot application server 300 via the network 10 and accepts an operation by the user using the client terminal 100. The Web browser 111 can have a configuration to operate on the message app 110. In other words, the Web browser 111 can be the Web browser 111 that is activated independently or can be a browser in an app called WebView. In a case of the browser in the app, it is possible to display Web contents such as HTML, in the message app 110.

The message app server 200 stores identification information associated with the user using the message app 110 and manages transmission and reception of a message or a file with a different user. The message app server 200 receives the message or the file transmitted from the message app 110 and transmits a message reception event to the Bot application 310 via the network 10. The message app server 200 also transmits a message to the message app 110 via the network 10 based on a request from the Bot application 310. The message to be transmitted can include a uniform resource locater (URL). The message app 110 can display an image indicating a URL. The message app 110 can display linked contents by activating the Web browser 111. The Web browser 111 can have a configuration in which the Web browser 111 is activated by selecting a button included in the message.

The Bot application 310 receives the event notification from the message app server 200, executes processing based on the contents of the received event, and transmits a message transmission request to the message app 110 via the network 10 as needed. Based on a request from the Web browser 111 of the client terminal 100, the Bot application 310 creates a Web page based on information stored in the database 320, and replies.

The database 320 of the Bot application server 300 stores information on the printer 500 of each user of the message app 110, information on print setting of print data, and the like. The database 320 of the Bot application server 300 stores a correspondence between the identification information on the user of the message app 110 and an account of the user of the printer management application 420. The file storage 330 of the Bot application server 300 stores a file as a target to be printed by the printer 500.

The file storage 410 included in the Web print server 400 stores print job data converted into a format processable by the printer 500. The printer management application 420 included in the Web print server 400 manages and authenticates the printer 500 registered with the account of the user.

The printer management application 420 generates a print request received from the Bot application 310 as a print job and transmits the print job to the printer 500. The account managed and authenticated by the printer management application 420 includes at least a user identification (ID). The user ID (account information) is different from the account used in the message app 110, but, the same account can be shared. The printer 500 in the print system of the present embodiment is registered with the printer management application 420 in advance by the user of the message app 110. In the present embodiment, the number of the printer 500 stored by the user (account) of the printer management application 420 is one. In another exemplary embodiment, multiple printers 500 can be stored. That is, multiple printers can be registered with one user account of the printer management application 420 in association with each other. In a case where multiple printers are registered with one user account in association with each other, the user can designate a printer to be used for printing from among the multiple printers before printing, or a printer to be usually used can be designated in advance as a default printer.

The database 430 of the Web print server 400 stores account information that is already registered with the printer management application 420, information on the printer 500, status information or print job information on the printer 500, and the like.

The printer 500, after receiving a print job notification from the printer management application 420 of the Web print server 400, obtains the print job from the file storage 410 and executes printing.

The example of the print system in FIG. 1 illustrates an example where the Bot application server 300 includes the Bot application 310, the database 320, and the file storage 330. This configuration is not seen to be limiting. In another exemplary embodiment, the Bot application 310, the database 320, and the file storage 330 respectively can be provided in different servers. In other words, the Bot application server 300 can be a server system including one or more servers. The function(s) provided by the Bot application 310, described in detail below, can be distributed across include multiple servers. The Web print server 400 can also include one or more print server systems. In another exemplary embodiment, the Bot application server 300 and the Web print server 400 can be implemented by the same server. The message app server 200 can be implemented in a similar fashion as described with respect to the Bot application server 300 and the Web printer server 400.

<Hardware Configuration>

Figure 2:
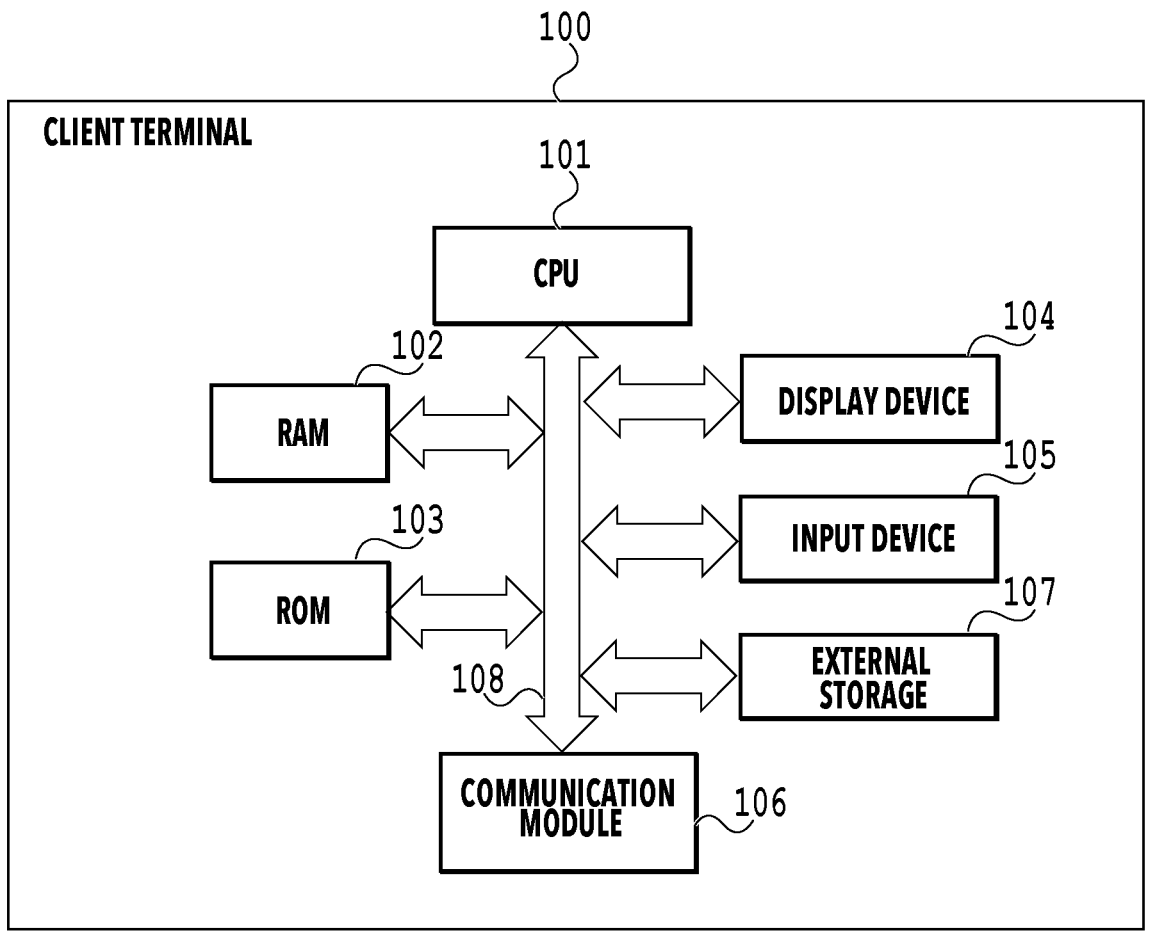
FIG. 2 is a diagram illustrating an example of a hardware configuration of a client terminal.

FIG. 2 is a diagram illustrating an example of a hardware configuration of the client terminal 100. The client terminal 100 includes a CPU 101, a RAM 102, a ROM 103, a display device 104, an input device 105, a communication module 106, an external storage 107, and a system bus 108.

The CPU 101 performs calculation, determination, and control of data and a command according to a program stored in the RAM 102 or the ROM 103. The RAM 102 is used as a temporary storage region while the CPU 101 performs various kinds of processing. The ROM 103 stores an operating system (OS), the message app 110, the Web browser 111, and other application software.

The display device 104 includes a liquid crystal display and a graphic controller and displays the Web page downloaded from the server, a graphic user interface (GUI), and the like. The Web page is displayed with the Web browser 111 downloading the Web page to the RAM 102 and displaying on the display device 104. The input device 105 is a device operated by the user to provide various instructions to the client terminal 100 and is, for example, a keyboard. The input device 105 can be a device for obtaining an image and can be, for example, a camera. The client terminal 100 inputs various instructions from the user and performs various types of control in based on the instructions.

The communication module 106 is an interface connected with, for example, a LAN cable, and establishes data communication with the message app server 200 and the Bot application server 300 via a not-illustrated router and the network 10. The data communication can be established wirelessly by, for example, a wireless-enabled interface. The system bus 108 exchanges data between the CPU 101 and the RAM 102, the CPU 101 and the ROM 103, etc.

The client terminal 100 in FIG. 2 illustrates the display device 104 and the input device 105 as separate devices. In another exemplary embodiment, where for example, a touch panel display or the like is used, the display device 104 and the input device 105 are provided as a single integrated device. In this embodiment, the camera device is provided separately from the touch panel display. In a case where the client terminal 100 is a smartphone, a flash memory is typically used as the external storage 107. The message app 110, the Web browser 111, or other application software are typically stored in the external storage 107.

Figure 3:
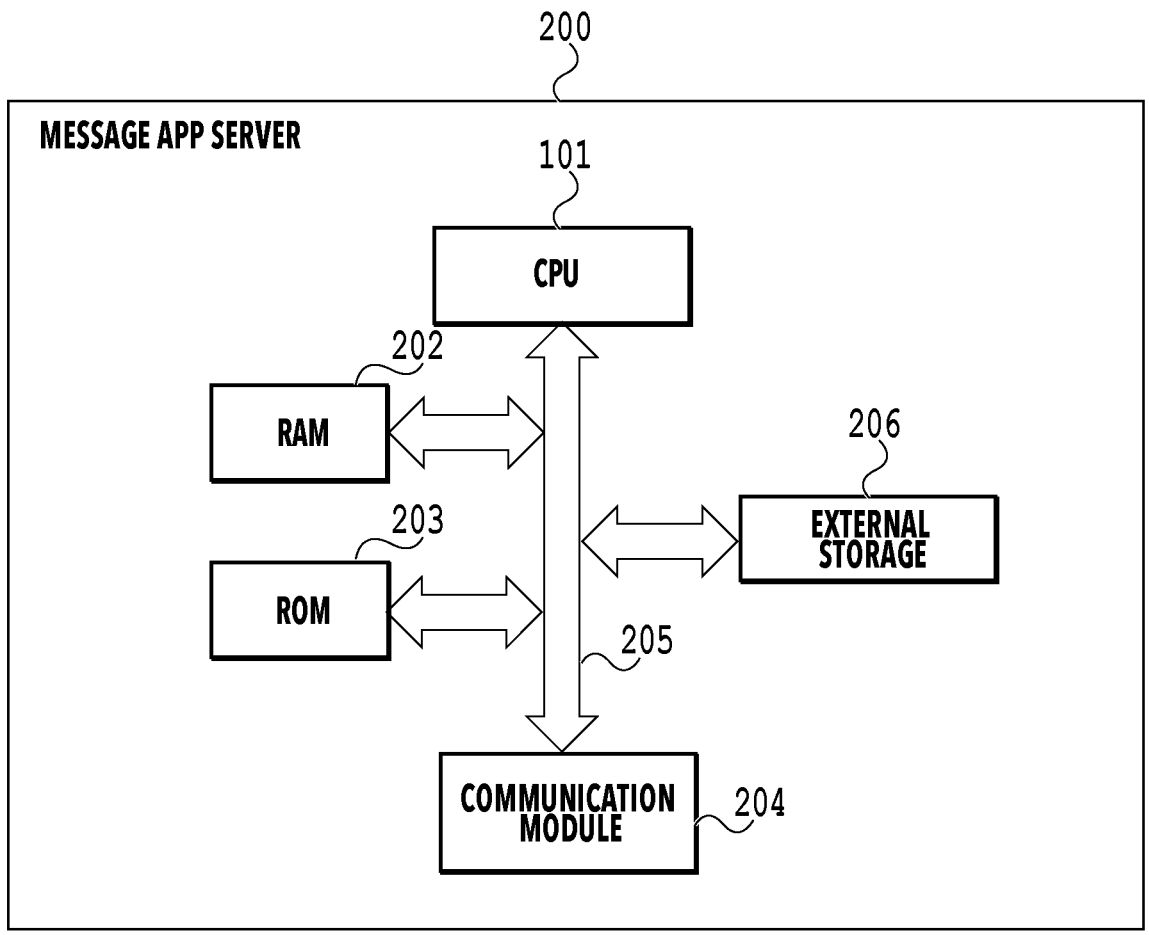
FIG. 3 is a diagram illustrating an example of a hardware configuration of a server.

FIG. 3 is a diagram illustrating an example of a hardware configuration of the message app server 200. The message app server 200 includes a CPU 201, a RAM 202, a ROM 203, a communication module 204, a system bus 205, and an external storage 206.

The CPU 201 performs calculation, determination, and control of data and a command according to a program stored in the RAM 202 or the ROM 203. The RAM 202 is used as a temporary storage region while the CPU 201 performs various kinds of processing. The external storage 206 stores various data such as an operating system (OS), an application, and the like.

The communication module 204 is an interface connected with, for example, a LAN cable, and establishes data communication with the client terminal 100 and the Bot application server 300 via a not-illustrated router and the network 10. The data communication can be established wirelessly by, for example, a wireless-enabled interface. The system bus 205 exchanges data between the CPU 201 and the RAM 202, between the CPU 201 and the ROM 203, etc.

FIG. 3 is an example of the hardware configuration of the message app server 200. In the present embodiment, the hardware configuration of the Bot application server 300 and the Web print server 400 are similar to that of the message app server 200. Accordingly, descriptions of the hardware configurations of the Bot application server 300 and the Web print server 400 are omitted herein.

Figure 4:
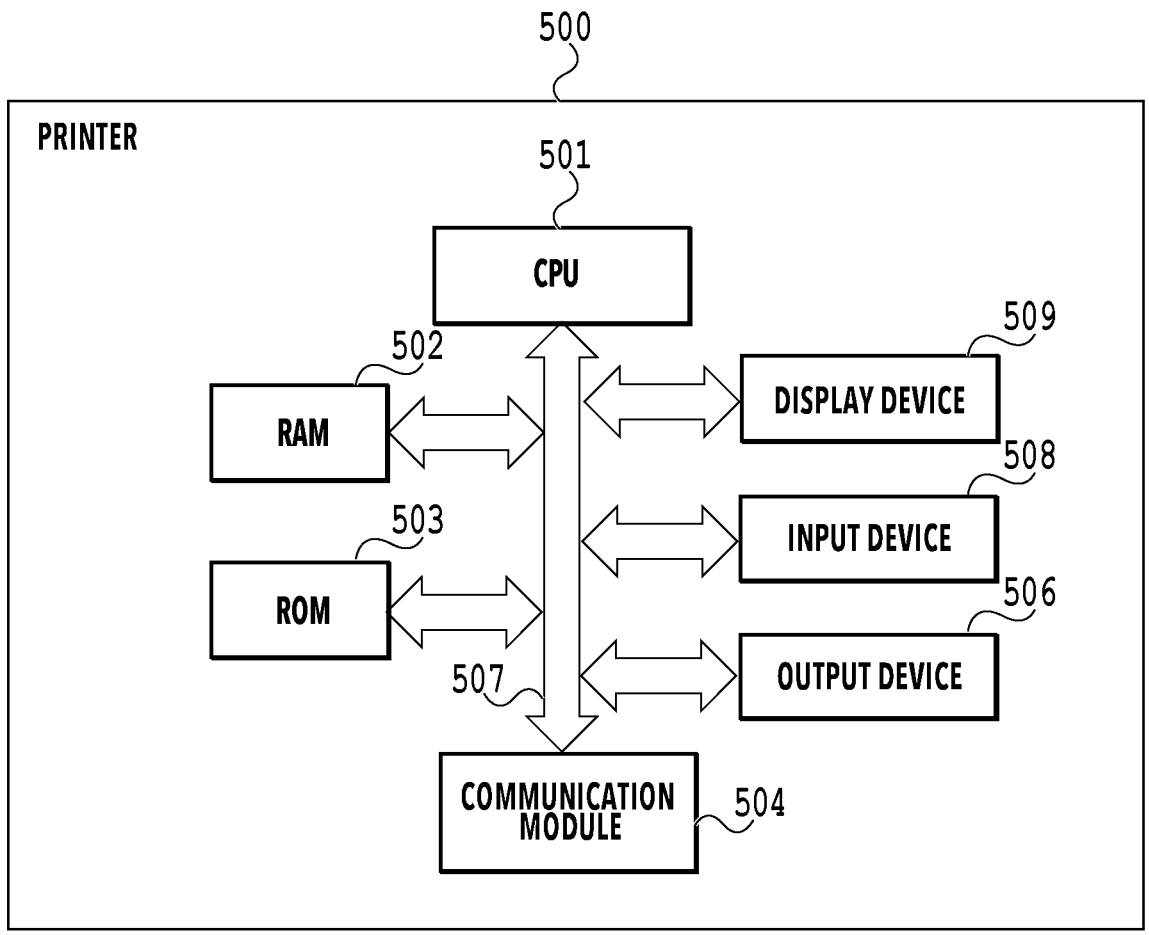
FIG. 4 is a diagram illustrating an example of a hardware configuration of a printer.

FIG. 4 is a diagram illustrating an example of a hardware configuration of the printer 500. The printer 500 includes a CPU01, a RAM 502, a ROM 503, a communication module 504, an output device 506, a system bus 507, an input device 508, and a display device 509.

The CPU 501 performs calculation, determination, and control of data and a command according to a program stored in the RAM 502 or the ROM 503. The RAM 502 is used as a temporary storage region while the CPU 501 performs various kinds of processing. The ROM 503 stores an operating system (OS) and other application software. The ROM 503 can be a non-volatile memory capable of rewriting data, and is typically implemented using flash memory.

The communication module 504 is an interface connected with, for example, a LAN cable, and establishes data communication with the Web print server 400 via a not-illustrated router and the network 12. The data communication can be established wirelessly by, for example, a wireless-enabled interface. The system bus 507 exchanges data between the CPU 501 and the RAM 502, the CPU 501 and the ROM 503, etc. The output device 506 is a device for forming an image on a recording medium, e.g., printing paper, and is, for example, a print device. The input device 508 is a panel operated by a user to provide various instructions to the printer 500 and is, for example, a hardware keypad.

The display device 509 displays a graphical user interface (GUI) and the like. The display device 509 can include full color liquid crystal or can include a several LEDs. In another exemplary embodiment, the display device 509 can be omitted.

<Registration Sequence of Print Data>

Figure 5:
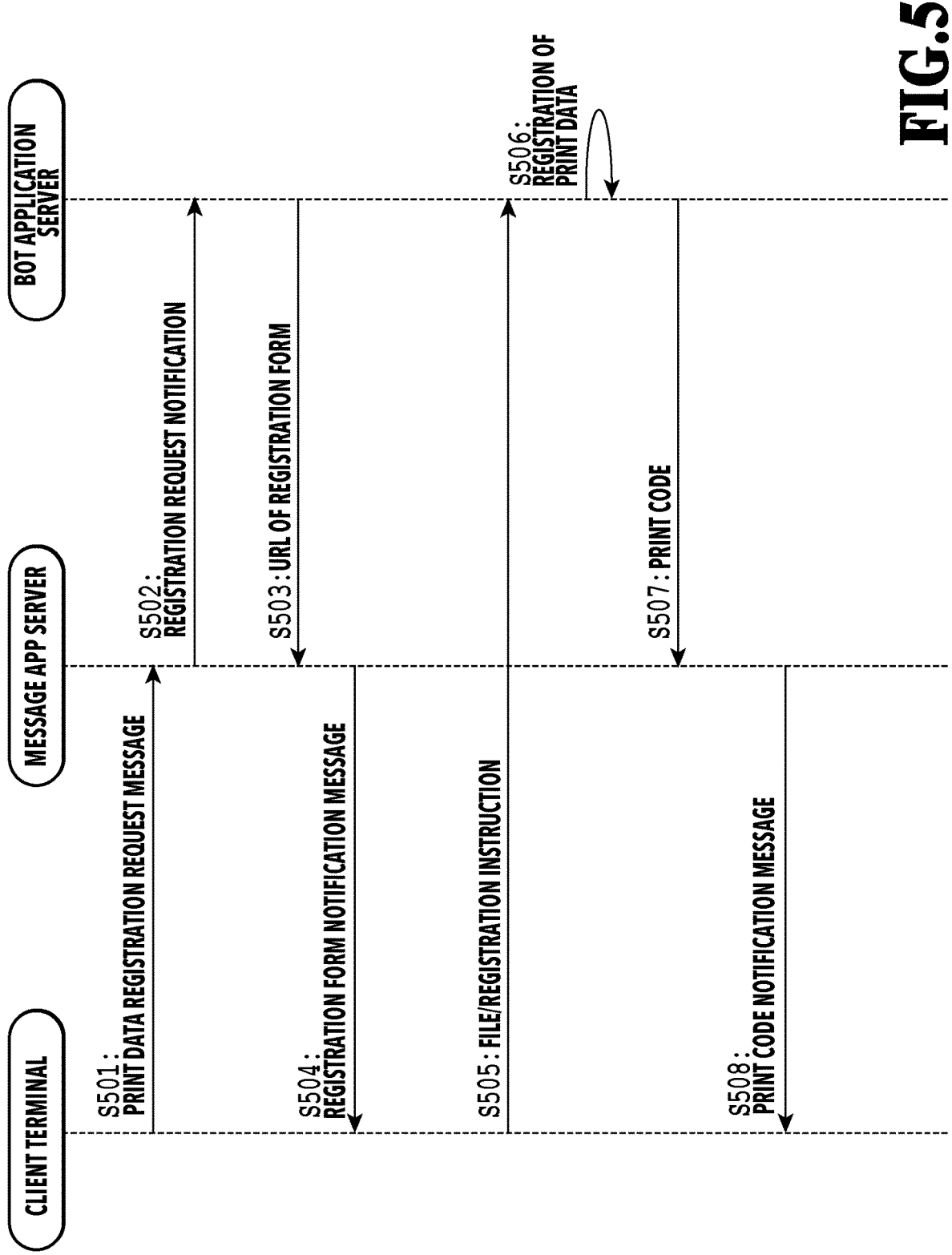
FIG. 5 is a sequence diagram illustrating an example of processing of registering print data.

FIG. 5 is a sequence diagram illustrating an example of print control processing of the present embodiment in which the print data is registered with the Bot application server 300 by using the client terminal 100. The series of processing illustrated in the sequence in FIG. 5 is executed by the respective CPU of the client terminal 100, the message app server 200, and the Bot application server 300. In other words, the series of processing illustrated in the sequence in FIG. 5 is performed by the CPU of each device by executing a program code stored in the respective ROM, external storage, or the like via the respective RAM. In another exemplary embodiment, part of or all the functions of the steps in FIG. 5 can be implemented by hardware such as an ASIC or an electronic circuit. A sign "S" in the description of each processing means a step in the sequence diagram.

Figure 6:
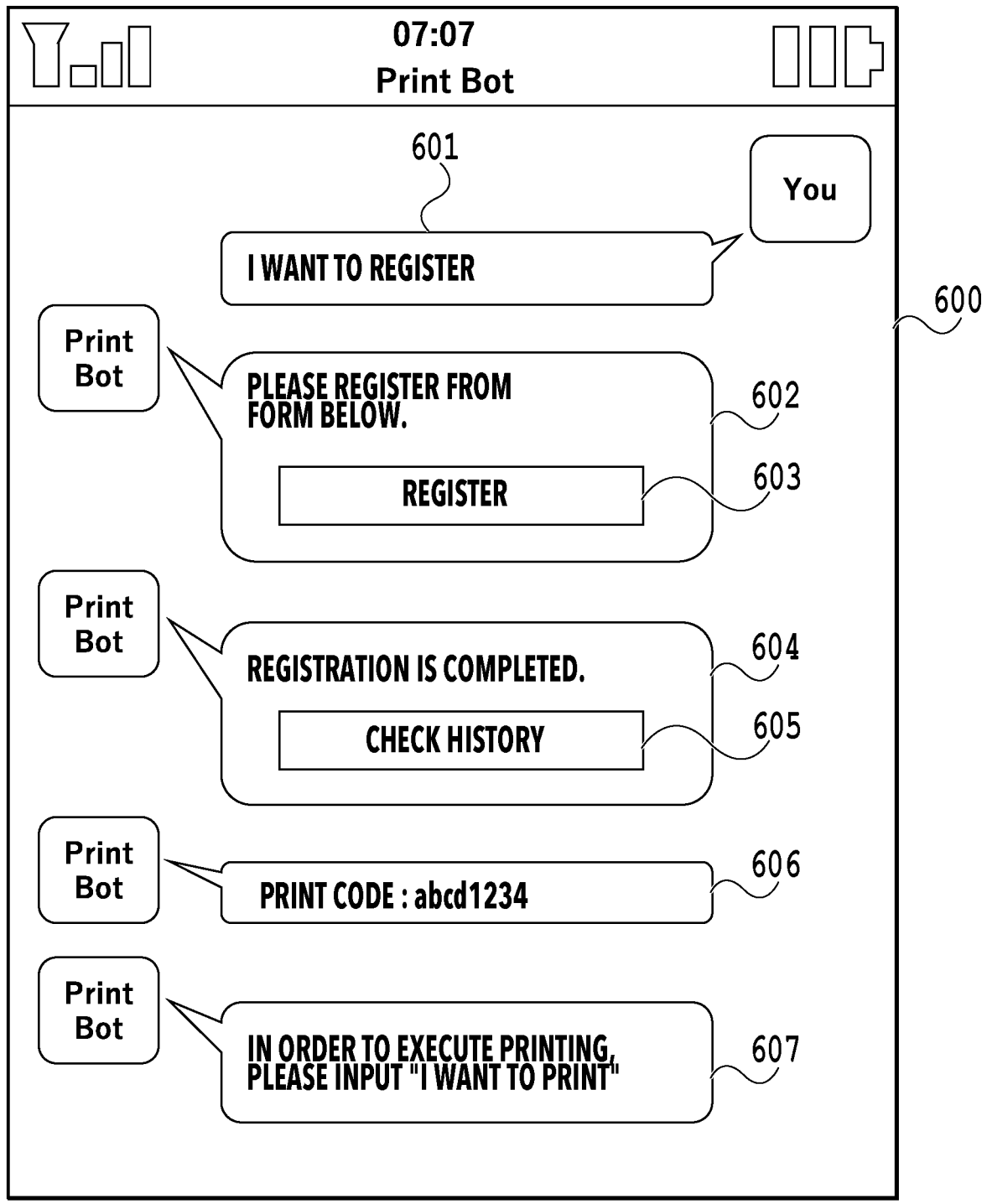
FIG. 6 is an example of a message talk screen.

FIG. 6 is an example according to an aspect of the present embodiment of a message talk screen 600 displayed on the display device 104 of the client terminal 100. The message talk screen 600 is displayed by the message app 110. In the message app 110, a message and a file transmitted from both the user and a partner of the message talk are displayed in the message talk screen 600 and are displayed in chronological order from an upper section of the message talk screen 600 to a lower section of the message talk screen 600. In the example in FIG. 6, a word balloon on a left section of the message talk screen 600 represents a message transmitted from the partner, and a word balloon on a right section of the message talk screen 600 represents a message transmitted from the user. In the example in FIG. 6, an example in which the partner talking with the user is the Bot application 310 is represented as "Print Bot".

A registration sequence of the print data will now be described with reference to the sequence diagram in FIG. 5 and the message talk screen 600 in FIG. 6. Turning to FIG. 5, in S501, the message app 110 of the client terminal 100 transmits a print data registration request message 601 to the message app server 200 based on a user operation on the input device 105. In the example in FIG. 6, the user inputting a message "I want to register" to the message talk screen 600 results in the print data registration request message being transmitted to the message app server 200. In the present case, for example, the user inputs the message using a software keyboard as the input device 105. This example is not seen to be limiting. The registration request message can be transmitted by any method that would enable implementation of the present embodiment, such as operation of a menu or the like arranged in the message talk screen 600.

The message app server 200, after receiving the print data registration request message, transmits a registration request notification to the Bot application 310 in S502. The registration request notification includes at least identification information identifying the user who transmits the message, where the identification information identifies the user of the message app 110. As illustrated in FIG. 6, the contents of the registration request notification include the message itself, "I want to register", which is inputted by the user. In other words, the message app server 200 transmits the message transmitted from the message app 110 directly to the Bot application server 300. The Bot application server 300 performs processing of confirming the contents of the message to specify the type of the message. More specifically, in the example in FIG. 6, based on the message "I want to register", the Bot application server 300 determines that the message is a registration request notification.

In S503, after the Bot application 310 receives the registration request notification, the Bot application 310 transmits a message including a URL for opening a form for making registration to the message app server 200. Then, in S504, after receiving the message, the message app server 200 directly transmits a registration form notification message to the message app 110. The message including the URL received by the message app server 200 in S503 includes the identification information identifying the user, which enables the message app server 200 to specify the message app 110 as a transmission destination based on the identification information.

The message app 110 displays the registration form notification message 602 received in S504 on the message talk screen 600. As described above, the notification message 602 is a message transmitted from the Bot application server 300 via the message app server 200. The client terminal 100 activates the Web browser 111 based on the user selecting the URL 603 included in the notification message 602. The client terminal 100 then displays the form for registering the print data on the Web browser 111. The format for displaying the URL can include text, a button, an image, etc. In FIG. 6, the URL 603 is displayed in the format of a button labeled "Register". As described above, the notification message 602 is transmitted from the Bot application server 300, and thus, the various display formats are determined by the Bot application server 300.

Figure 7:
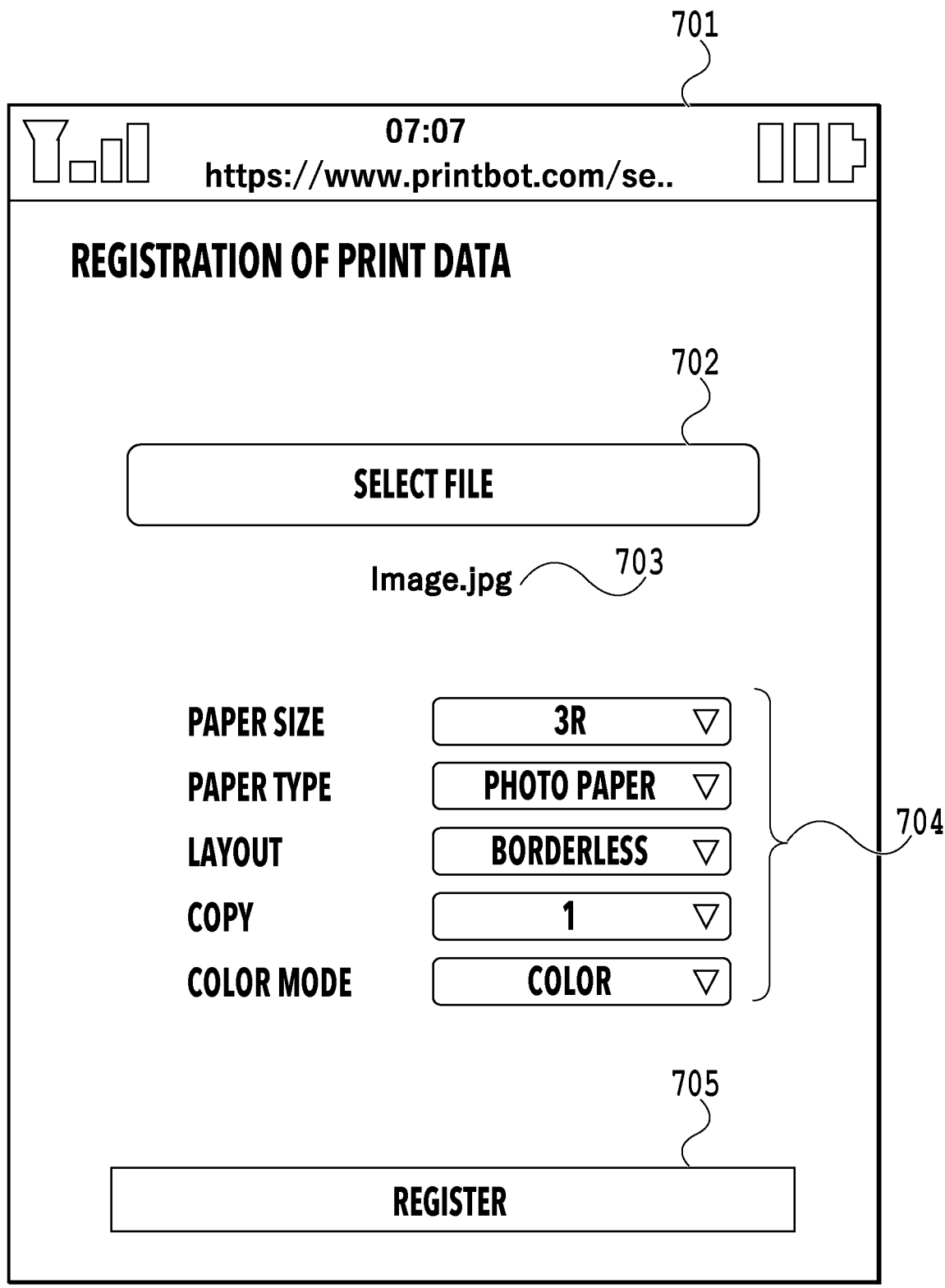
FIG. 7 is a diagram illustrating an example of a form for registering the print data.

FIG. 7 is a diagram illustrating an example of a registration form 701 that is displayed on the Web browser 111 to make registration of the print data. As described above, the registration form 701 is a form provided by the Bot application server 300. In the registration form 701, the user can select a file stored in the external storage 107 in the client terminal 100 by selecting a file selection button 702 via the input device 105. In another exemplary embodiment, in a case of a client terminal such as a PC having a GUI function, a file can be selected by a drag and drop operation by the user.

The registration form 701 can restrict a file that can be selected on the registration form depending on the type or the OS of the user terminal. In other words, the type of the file transmittable from the registration form can be restricted. For example, in a case where the Bot application server 300 only allows for a JPEG (.jpg) file, it is possible to restrict the file that can be selected from a file selection screen on the user terminal to a JPEG (.jpg) file depending on the function or the OS of the user terminal. If the restriction on the file that can be selected does not function properly, the restriction can be canceled. In other words, a configuration where no restriction is made can be applied in a case where the registration form operating on the Web browser 111 calls a file selection function of the user terminal.

Once a file is selected, a file name 703 of the selected file is displayed in the registration form 701. An item 704 designating print setting for printing the registered print data is displayed in the registration form 701, and various items are configured to be settable by a user operation. The items of the print setting can be changed depending on the type of the selected file. Print setting appropriate for the printer associated with the user managed by the printer management application 420 can be set as an initial value. For example, the Bot application server 300 (Bot application 310) and the Web print server 400 (printer management application 420) can cooperate with each other in advance. The user of the message app 110 and the user of the printer management application 420 can be associated with each other in advance. In this case, print setting appropriate for the printer associated with the user managed by the printer management application 420 can be set as an initial value of the item 704. The correspondence between the user of the message app 110 and the user of the printer management application 420 is managed in the Bot application server 300.

Once a button 705 in the registration form 701, which enables executing the registration, is selected by the user, the Web browser 111 of the client terminal 100 uploads the selected file. In other words, the Web browser 111 uploads the selected file to the file storage 330 in the Bot application server 300 in S505 of FIG. 5. If the selected file is a type that does not allow uploading to the Bot application server 300, an error indicating the upload is not allowed can be displayed on the registration form 701 to notify the user. In another exemplary embodiment, if the selected file is located on a cloud storage device and access from the registration form is not allowed, an error indicating that access is not allowed can be displayed on the registration form 701 to notify the user. After uploading of the file is completed, the Web browser 111 transmits a registration instruction of the item 704 selected in the registration form 701 to the Bot application 310. The registration instruction includes at least the values inputted to the print setting items and the identification information on the user. For example, the URL of the registration form includes identification information that is newly generated by the Bot application 310 based on the identification information on the user of the message app 110. Thus, the registration instruction via the registration form of the URL includes the identification information identifying the user of the message app 110. A mode in which the URL includes the identification information itself of the user of the message app 110 can be applied.

As described above, in the present embodiment, the message app 110 exchanges messages with the Bot application 310 using the message talk screen 600. In a case of registering a file desired to be printed, no file is transmitted to (registered with) the message talk screen 600 provided by the message app 110. Instead, the client terminal 100 transmits the file desired to be printed to the Bot application server 300 via the registration form 701 provided by the Bot application server 300. That is, in S505 of FIG. 5, the file desired to be printed is transmitted directly to the Bot application server 300, bypassing the message app server 200. Therefore, even in a case where there is a restriction on the file to be registered in the message app server 200, an appropriate file is transmitted from the client terminal 100 to the Bot application server 300. For example, even in a case where a configuration in which a file is downsized in the message app server 200, it is possible to register an appropriate file with the Bot application server 300.

After receiving the registration instruction, in S506 the Bot application 310 issues a print code uniquely identifying the uploaded file. The Bot application 310 then registers the print code, the print setting included in the registration instruction, and the file in the database 320 in association with each other.

Next, in S507, the Bot application 310 transmits the issued print code to the message app server 200. Since the registration instruction received in S505 includes the identification information on the user, the Bot application 310 transmitting the print code with the identification information on the user to the message app server 200 enables the message app server 200 to transmit the print code to the message app 110 as the target destination.

In S508, the message app server 200, after receiving the print code from the Bot application server 300, transmits a notification message of the print code to the message app 110. The notification message of the print code can include a URL to a form for confirming the history of the registered print data. In other words, the print code transmitted from the Bot application server 300 in S507 can include the URL to the form for confirming the history of the registered print data.

The message app 110, after receiving the notification message of the print code, displays a registration completion message 604 and a print code notification message 606 on the message talk screen 600. In a case where the registration completion message 604 includes a URL 605 to the form for confirming the history of the registered print data, the URL 605 is displayed together with the completion message 604. The URL 605 can be displayed in any format that would enable implementation of the present embodiment, including but not limited to text, a button, or an image. The Bot application 310 can additionally display a message 607 on the message talk screen 600 prompting printing.

<Sequence of Executing Printing by Using Print Code>

Figure 8:
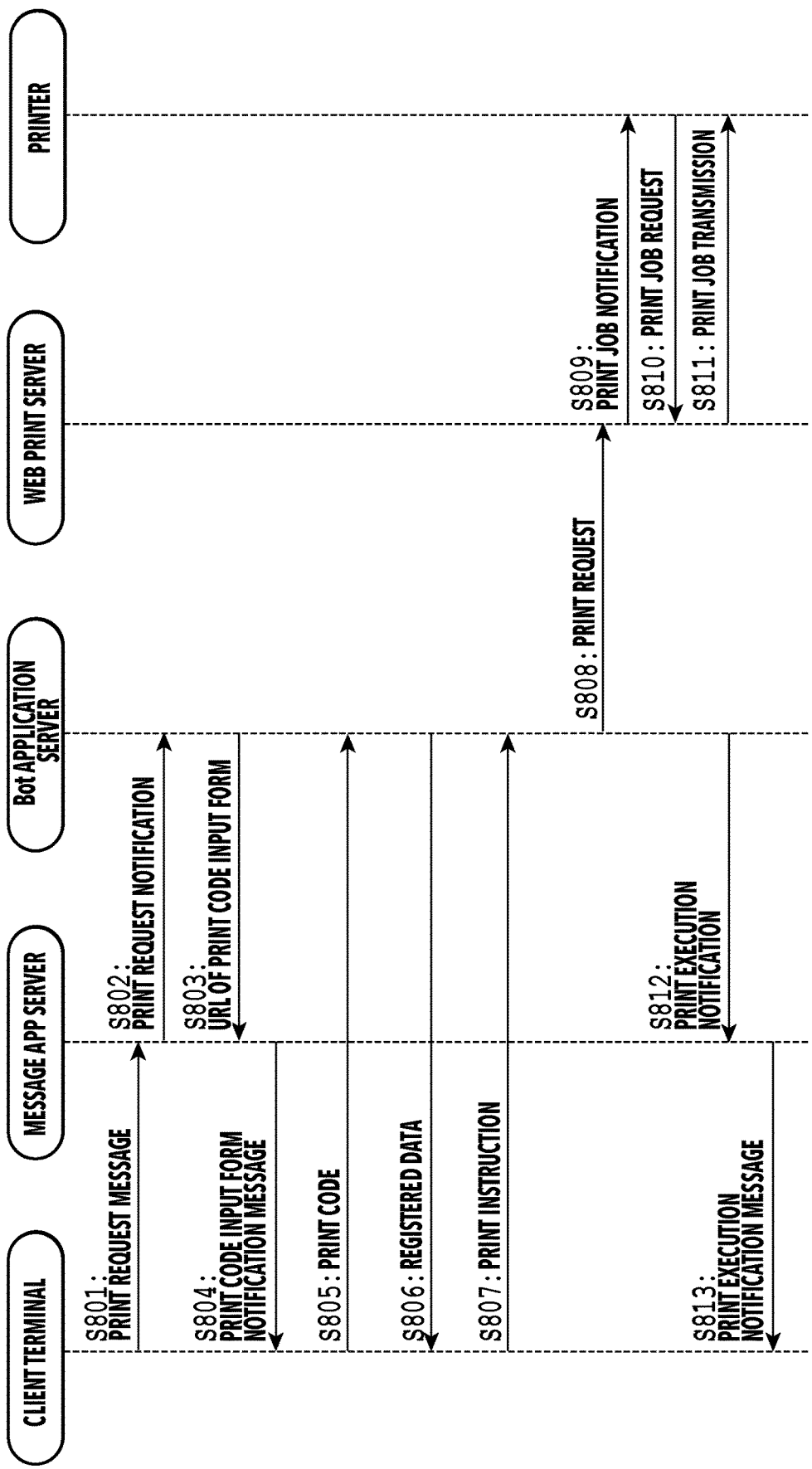
FIG. 8 is a sequence diagram of processing of executing printing by using a print code.

FIG. 8 is a sequence diagram of print control processing of the present embodiment in which printing is executed by using the print code. The series of processing illustrated in the sequence in FIG. 8 is executed by the respective CPU of the client terminal 100, the message app server 200, the Bot application server 300, the Web print server 400, and the printer 500. In other words, the series of processing illustrated in the sequence in FIG. 8 is performed by the CPU of each device by executing a program code stored in the respective ROM, the external storage, or the like via the respective RAM. In another exemplary embodiment, part of or all the functions of the steps in FIG. 8 can be implemented by hardware such as an ASIC or an electronic circuit.

Figure 9:
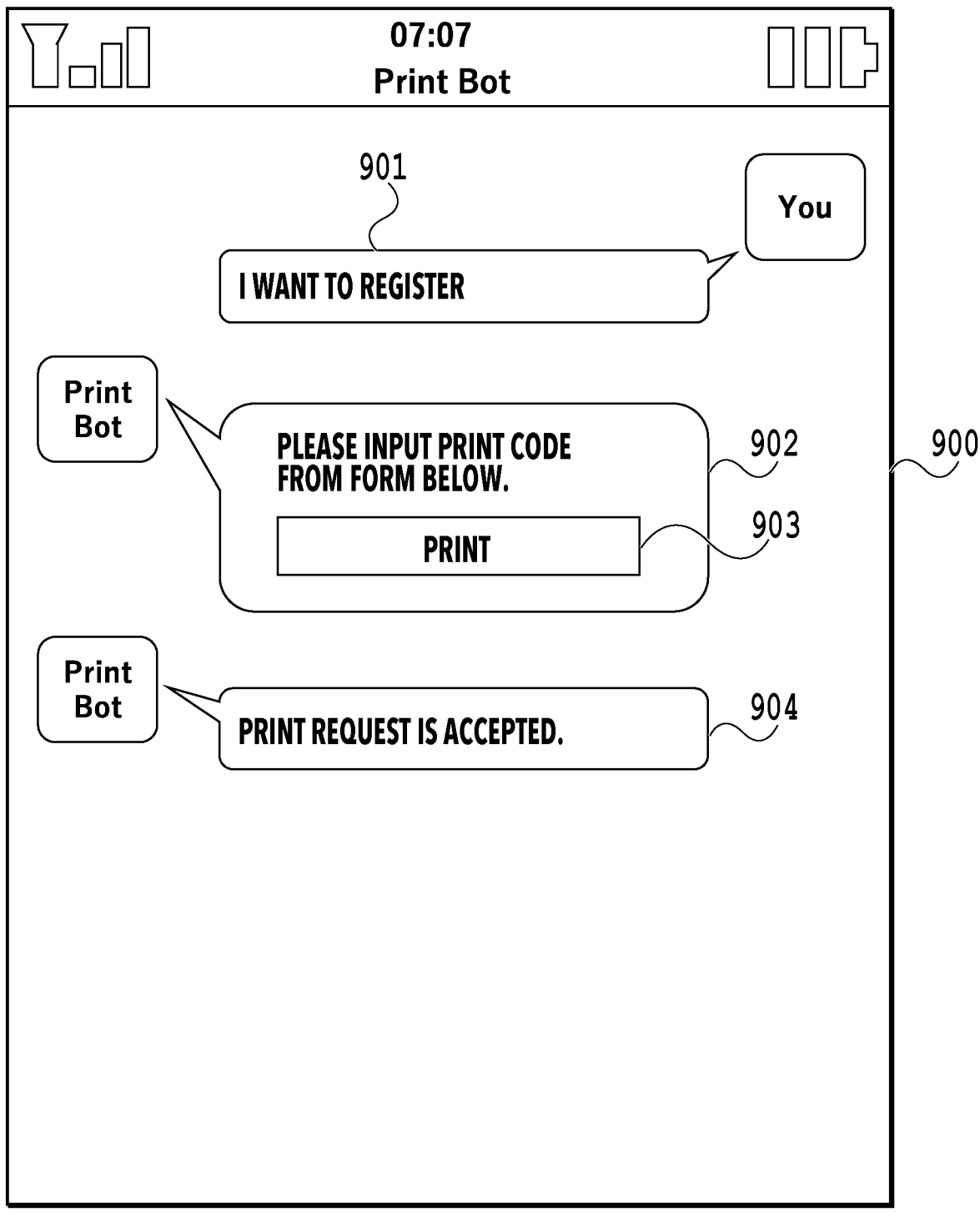
FIG. 9 is a diagram illustrating an example of the message talk screen.

FIG. 9 is a diagram illustrating an example according to an aspects of the present embodiment of a message talk screen 900 displayed on the display device 104 of the client terminal 100 in a case where printing is executed by using the print code.

Similar to the message talk screen 600 in FIG. 6, the message talk screen 900 in FIG. 9 also illustrates an example in which the talk partner is the Bot application 310, which is represented as "Print Bot". The message talk screen 900 in FIG. 9 is illustrated as an instance of a new screen. In another exemplary embodiment, the message illustrated in FIG. 9 can appear subsequent to the message in the message talk screen 600 in FIG. 6.

In S801, the message app 110 of the client terminal 100 transmits a print request message 901 of the print data to the message app server 200 based on a user operation of the input device 105. In the example of the message talk screen in FIG. 9, inputting the message "I want to print" results in the message being transmitted to the message app server 200 as the print request message 901. The print request message can be transmitted by operating a menu or the like arranged in the message talk screen 900.

In S802, the message app server 200, after receiving the print request message, transmits a print request notification to the Bot application 310. The print request notification in S802 includes the identification information identifying the user who transmits the message.

In S803, the Bot application 310, after receiving the print request notification, transmits a message including a URL to a form for inputting the print code to the message app server 200. In response to the message, the message app server 200 transmits a notification message of the print code input form to the message app 110 in S804. The message including the URL to the form for inputting the print code that is transmitted from the Bot application server 300 includes the identification information identifying the user. Thus, the message app server 200 can specify the message app 110 as the transmission target.

In some cases, the Bot application 310 does not enable printing of a file registered by a third person other than the user who transmits the print request. In this case, the Bot application 310 can obtain, from the database 320, whether there is the print data that was previously registered in the past by the user who transmits the print request, and if there is no registered print data, the Bot application 310 can transmit a message prompting the registration of the file for printing to the message app server 200. In a case of confirming whether there is the data that was previously registered, a period can be set. In other words, a user who has not registered a file within a predetermined period can be determined as the user who has not previously registered a file. The message app server 200, after receiving the message prompting the registration, transmits a notification message of the message prompting the registration to the message app 110 (not illustrated in FIG. 9).

Next, processing implemented by the message app 110 upon receipt of the message including the URL to the form for inputting the print code is described. The message app 110 displays a notification message 902 of the received print code input form on the message talk screen 900. A URL 903 included in the message 902 is selected via a user operation. The client terminal 100 then activates the Web browser 111 and displays the form for inputting the print code on the Web browser 111. The URL can be displayed in any format, including but not limited to text, a button, or image.

Figure 10A:
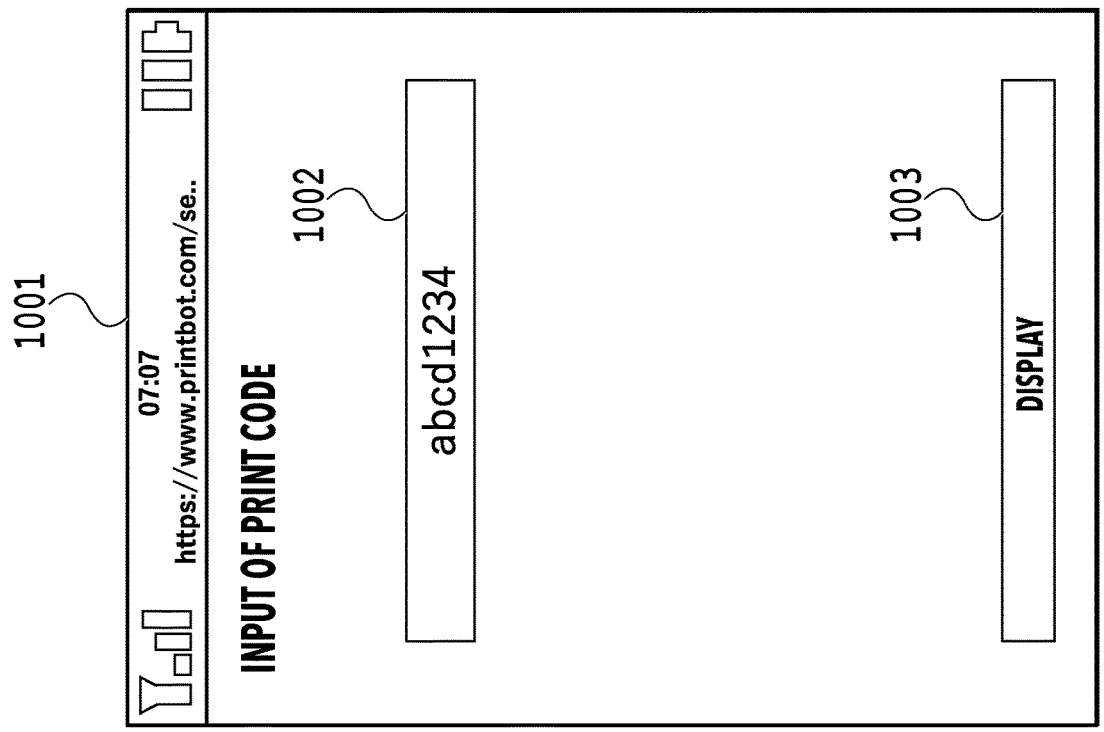
FIGS. 10A and 10B are diagrams illustrating an example of a form.
Figure 10B:
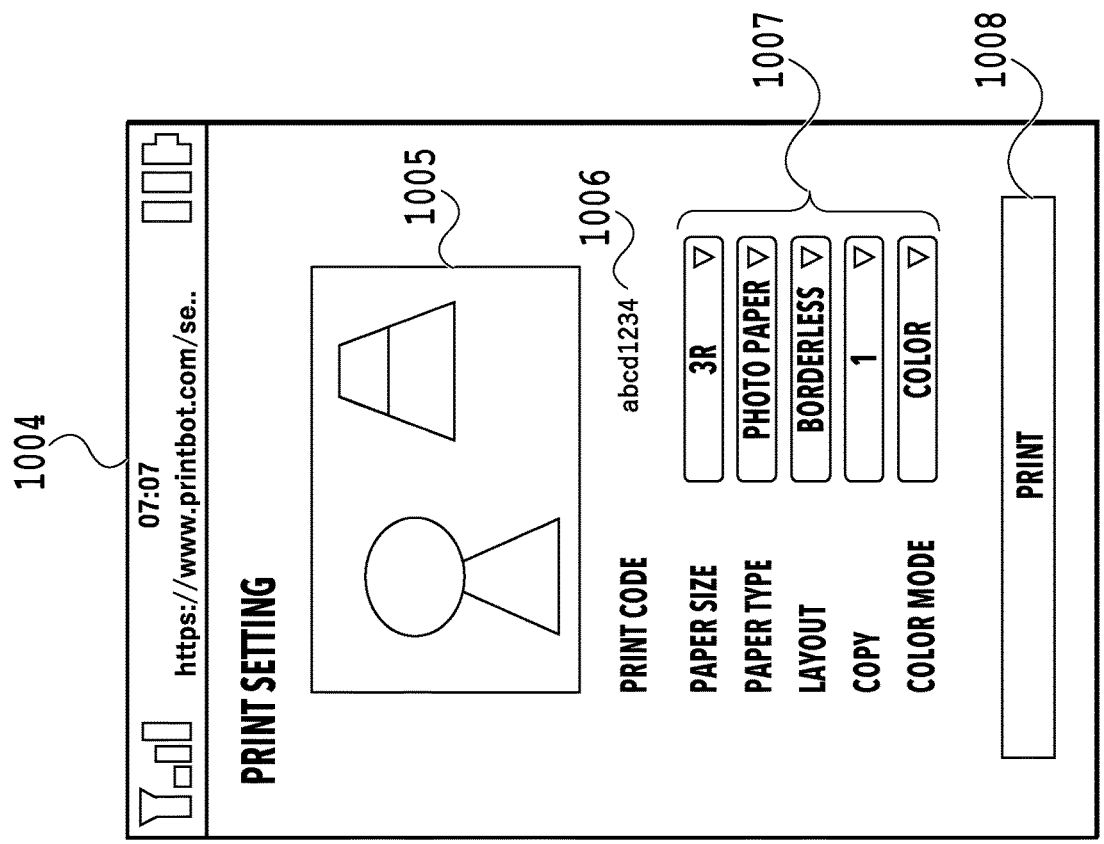

FIGS. 10A and 10B are diagrams illustrating an example of the form displayed on the Web browser 111. FIG. 10A is a diagram illustrating an input form 1001 that is displayed on the Web browser 111 once the URL 903 included in the message 902 is selected by a user operation. In the input form 1001, an item 1002 via which the print code is inputted accepts an input of the print code by a user operation. In the input form 1001, the letter type or the number of letters that the user is able to input can be restricted.

In the input form 1001, once the user selects a display button 1003, the Web browser 111 transmits a request of the registered data information with the print code inputted to the input form 1001 to the Bot application 310 in S805 of FIG. 8. The Bot application 310, after receiving the request, obtains the registered print data corresponding to the print code from the database 320 and transmits the registered print data to the client terminal 100 in S806. In a case where the obtained print code is unavailable, the Bot application 310 can notify the user of the unavailability. The client terminal 100 that obtains the information on the registered data displays a print setting screen of the print data corresponding to the print code on the Web browser 111.

FIG. 10B is a diagram illustrating an example of a print setting screen 1004 of the print data corresponding to the print code that is displayed on the Web browser 111. The print setting screen 1004 includes a thumbnail 1005 of the print data, a print code 1006, and a print setting item 1007. The thumbnail 1005 of the print data can be an icon indicating the type of print data. In the print setting item 1007, a value at the registration of the print data is set as an initial value. The print setting item 1007 can be changed via a user operation. For an item that is not set at the print data registration, print setting appropriate for the printer associated with the user managed by the printer management application 420 can be set as an initial value.

Turning back to FIG. 8, in S807, in the print setting screen 1004, selection of a button 1008 for executing printing results in the Web browser 111 of the client terminal 100 transmitting a print instruction to the Bot application 310. The print instruction includes at least the print code, the value inputted to the print setting item, and the identification information on the user. As with the above-described registration form, the URLs of the print code input form 1001 and the print setting screen 1004 include the identification information based on the identification information on the user of the message app 110. The Web browser 111 transmits the print instruction with the identification information to the Bot application server 300.

As described above, the processing from S805 to S807 is processing in which the client terminal 100 and the Bot application server 300 directly exchange data without the message app server 200.

In S808, the Bot application 310, after receiving the print instruction, generates a print request based on the print setting and the print data corresponding to the print code. The Bot application 310 then transmits the generated print request to the printer management application 420 of the Web print server 400. The print request includes storage destination information indicating the storage destination of the file of the print data. In this case, the storage destination of the file is the file storage 330 of the Bot application server 300.

In S809, the printer management application 420, after receiving the print request, obtains a file from the storage destination information on the file of the print data included in the print request. The printer management application 420 generates a print job by using the file and the print setting included in the print request. The printer management application 420 then provides print job notification to the printer 500. The print job notification is a notification that there is a print job.

In S810, the printer 500, after receiving the print job notification, makes a request to the printer management application 420 for the print job. Then, in S811, the printer management application 420, after receiving the print job request, transmits the print job to the printer 500 as a response to the print job. The printer 500, after receiving the print job, executes printing based on the print job.

After transmitting the print request to the printer management application 420 in S808, in S812, the Bot application 310 transmits a print execution notification indicating the transmission of the print request to the message app server 200. The print execution notification includes the identification information identifying the user.

Next, in S813, the message app server 200, after receiving the print execution notification, transmits a print execution notification message to the message app 110. The message app 110, after receiving the print execution notification message, displays a print execution notification message 904 on the message talk screen 900.

As described above, according to the present embodiment, a file is registered via a form provided from the Bot application server 300 on the client terminal 100 used by the user. In other words, the print data registration request message is transmitted in the message talk screen 900 with the Bot application 310 using the message app 110. The Bot application 310 then transmits the URL of the registration form to the message app 110 via the message app server 200. The client terminal 100 can transmit the file desired to be printed to the Bot application server 300 without the message app server 200 by selecting the URL. Therefore, with the file to be printed being directly transmitted to the Bot application server 300 without the message app server 200, it is possible to register the file without a restriction, such as downsizing of the file, in the message app 110.

The file registered as described above is associated with the print code issued from the Bot application server 300. Thus, in a case where a file is desired to be printed, it is possible to print the file with a simple mode by inputting the print code. For example, in the present embodiment, it is possible to input the print code on the client terminal 100 used at the registration of the print data. In other words, since the configuration does not require operation of the printer 500 or the like other than the client terminal 100 to input the print code, it is possible to easily input the print code. Since it is possible to input the print code without using an unfamiliar device, it is possible to reduce the workload of the user and to readily perform printing.

The first embodiment describes an example in which an instruction is transmitted to the Bot application 310 by selecting a button on the Web browser 111 either in a case of the processing of registering the print data or the processing of printing using the registered print data. An example is also discussed where the Bot application 310 that completes the processing notifies the client terminal 100 of a processing result with no notification from the message app server 200. Depending on the type of the message app 110, the message transmission from the Bot application 310 to the client terminal 100 can be restricted to the format in which a response is made to a notification from the user. The restriction is executed by the message app 110. In the present embodiment, an example is described of processing in a case where there is a restriction as described above. In the present embodiment, an example is described in which a message is transmitted from the Web browser 111 to the message app server 200 in a case where a button on the Web browser 111 is selected. With this, with the Bot application 310 responding to the message, it is possible to form a state in which it is as if the user and the Bot application 310 are having a conversation. Thus, it is possible to avoid the restriction of the message transmission from the Bot application server 300.

<Registration Sequence of Print Data>

FIG. 11 is a sequence diagram of processing of registering the print data with the Bot application server 300 from the Web browser 111 via the message app 110 according to the present embodiment.

Figure 12:
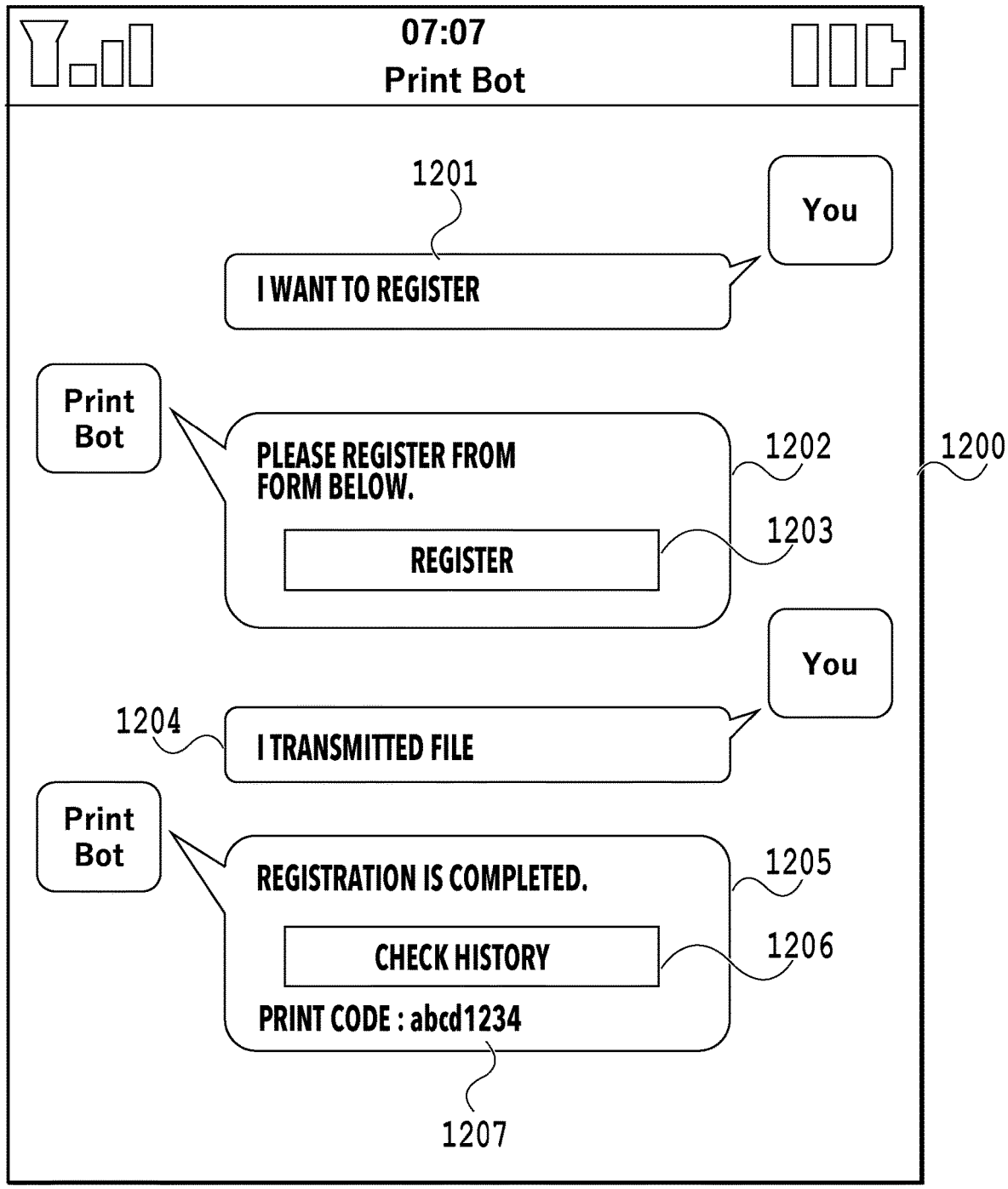
FIG. 12 is an example of the message talk screen.

FIG. 12 is an example of a message talk screen 1200 that is displayed on the display device 104 of the client terminal 100 in a case where the registration is executed from the Web browser 111 via the message app 110 according to the present embodiment. Messages 1201 to 1203 and messages 1205 to 1207 are the same as the messages 601 to 606 in FIG. 6, and as such, detailed descriptions are omitted herein. The message 1205 indicates an example in which the URL 1206 for confirming the history and the message 1207 of the print code are included in one message.

Turning back to FIGS. 11, S1101 to S1105 are the same as S501 to S505 in FIG. 5. As such, detailed descriptions are omitted herein.

In S1106, once the upload of the file to the file storage 330 is completed, the Bot application server 300 registers the file in the database 320 as the print data. In this case, at least the storage destination information on the file, the print setting, and the identification information on the user are registered with the file of the print data. Once the registration of the print data is completed, in S1107, the Bot application server 300 returns a reception completion notification of the print data to the Web browser 111 of the client terminal 100.

In the present embodiment, the Web browser 111 performs processing in cooperation with the message app server 200. More specifically, the Web browser 111 uses a function of a Software Development Kit (SDK) of the message app 110 deployed in the Web browser 111. The Web browser 111 can transmit a message to the message app server 200 by using the function of the SDK. In other words, once receiving the print data reception notification as a response to the registration instruction using the registration form 701, the Web browser 111 transmits a print data transmission completion message 1204 to the message app server 200. The message app server 200 then outputs and displays the message 1204 on the message talk screen 1200. In response to the message 1204, the message app 110 transmits a transmission completion message to the message app server 200 in S1108. Then, in S1109, the message app server 200, after receiving the transmission completion message, transmits a transmission completion notification to the Bot application 310.

In S1110, the Bot application 310, after receiving the transmission completion notification, issues the print code uniquely identifying the print data. As described above, the registered print data includes the identification information on the user. Thus, the Bot application 310 extracts the print data corresponding to the identification information on the user of the message app 110 from the database 320 and issues the print code uniquely identifying the print data. The Bot application 310 additionally registers the issued print code with the print data registered in the database 320.

S1111 to S1112 are the same as S507 to S508 described in FIG. 5. As such, detailed descriptions are omitted herein. In S1112, notification of the message 1205 including the message 1207 of the print code is provided.

<Sequence of Executing Printing by Using Print Code>

Figure 13:
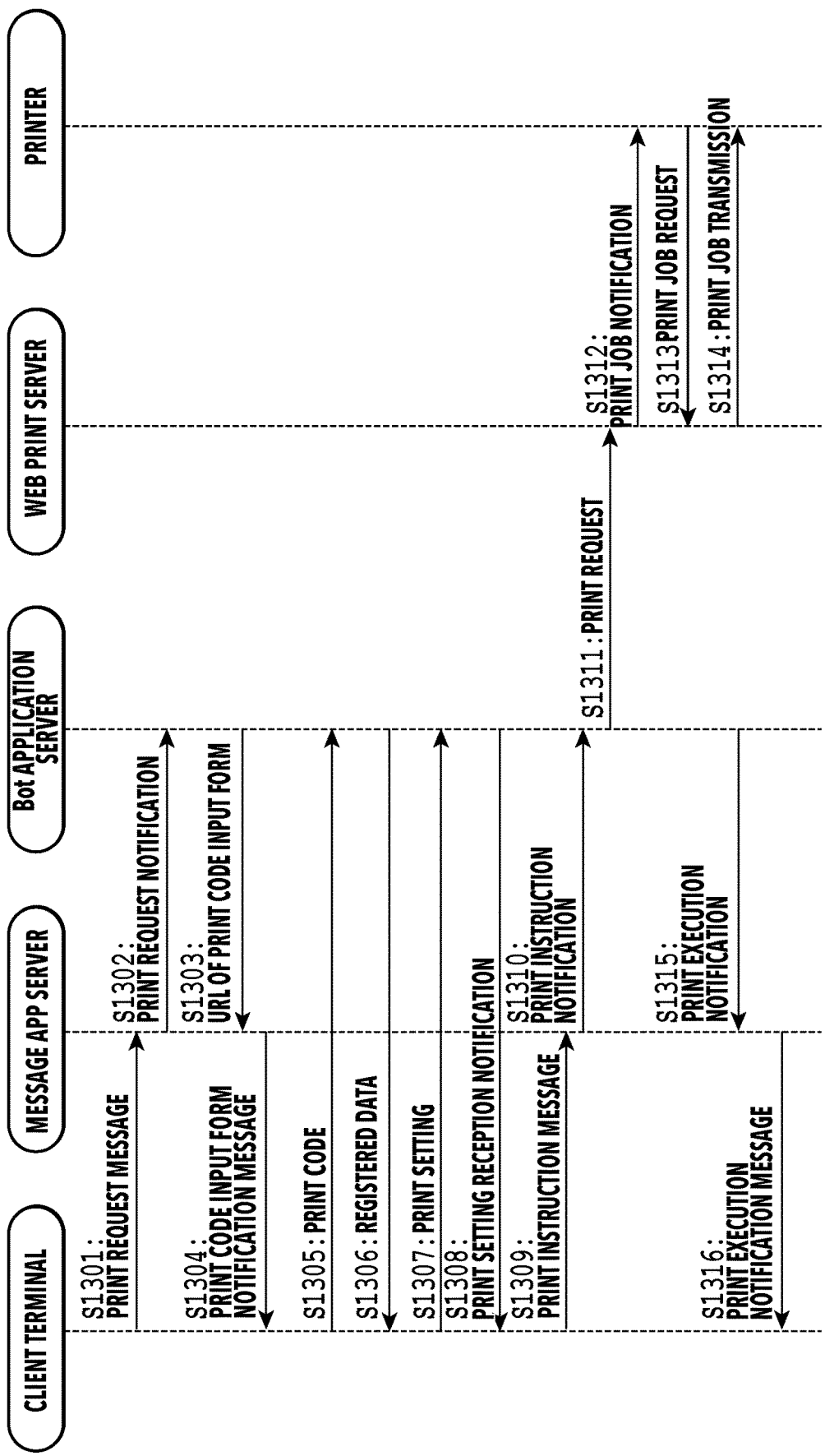
FIG. 13 is a sequence diagram of processing of executing printing by using the print code.

FIG. 13 is a sequence diagram of processing of executing printing using the print code according to the present embodiment.

Figure 14:
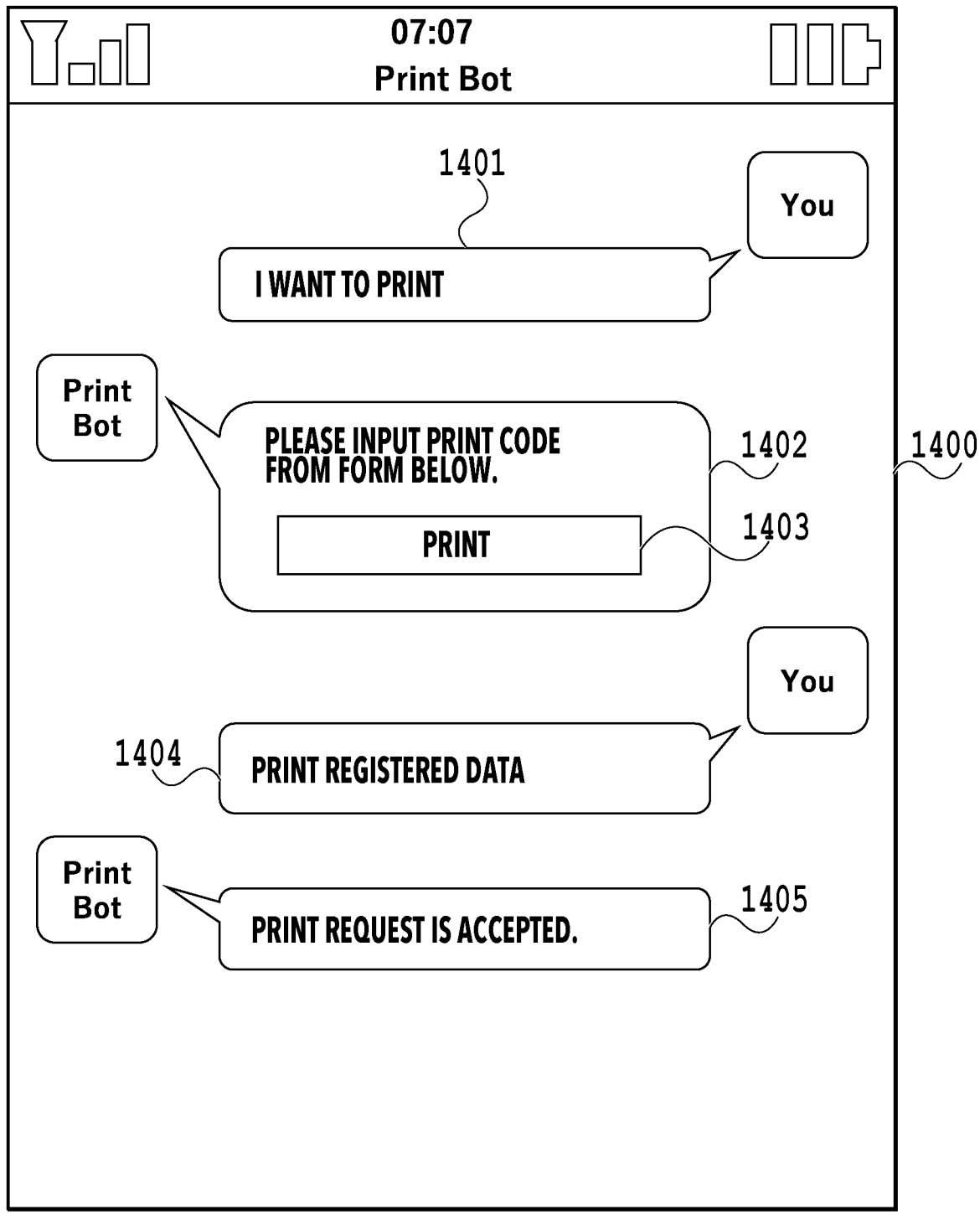
FIG. 14 is an example of the message talk screen.

FIG. 14 illustrates an example of a message talk screen 1400 that is displayed on the display device 104 of the client terminal 100 in a case where printing is executed from the Web browser 111 via the message app 110 according to the present embodiment. Messages 1401 to 1403 and a message 1405 are the same as the messages 901 to 904 in FIG. 9. As such, detailed descriptions are omitted herein.

S1301 to S1306 in FIG. 13 are the same processing as that of S801 to S806 in FIG. 8. As such, detailed descriptions are omitted herein.

In S1306, the Web browser 111, after receiving the registered data corresponding to the print code from the Bot application server 300 based on selection of the button 1008 for executing printing in the print setting screen 1004 in FIG. 10. Then, in S1307, the Web browser 111 transmits the print setting to the Bot application 310. The print setting transmitted in this process includes at least the print code, the value inputted to the print setting item 1007, and the identification information on the user. According to the present embodiment, the URLs indicating the input form of the print code and the print setting screen include the identification information on the user. Thus, the print setting transmitted in S1307 includes the user identification information obtained as described above.

In S1308, the Bot application 310, after receiving the print setting, registers the received print setting in the database 320 as the print setting data and returns a print setting reception completion notification to the Web browser 111. The print setting data includes at least the print code, the value inputted to the print setting item, and the identification information on the user.

Once receiving the print setting reception completion notification as a response to the instruction using the input form of the print code, the Web browser 111 transmits a print instruction message 1404 to the message app server 200. The message app server 200 then outputs and displays the message 1404 on the message talk screen 1400. In S1309, in response to the message 1404, the message app 110 transmits a print instruction message to the message app server 200. Then, in S1301, the message app server 200, after receiving the print instruction message, transmits a print instruction notification to the Bot application 310. The Bot application 310, after receiving the print instruction notification, generates a print request based on the registered print setting and the print data corresponding to the print code.

S1311 to S1316 are the same as S808 to S813 described in FIG. 8. As such, detailed descriptions are omitted herein.

As described above, according to the present embodiment, it is possible to register and print the print data with bi-directional communication in which the Bot application 310 responds to a notification from the message app 110 on the message talk screen 1400. Thus, it is possible to provide an effect where it appears as if the user is performing the procedure of the registration and printing of the print data via conversation with the Bot application 310. According to the above-described processing, even in a case where the message transmission from the Bot application 310 to the client terminal 100 is restricted to the format in which a response is made to a notification from the user, it is possible to properly register and print the print data.

In the above-described first embodiment, an example is discussed in which the Bot application 310 replies with the input form of the print code in response to the print request of the user and the print code is inputted on the input form of the print code as illustrated in FIG. 8. In this case, if it is possible to transmit a message to the message app server 200 without a user operation, a demand of reduction in the input workload by the user operation is applicable. In such a case, it is possible to omit the process of the user operation by directly transmitting the print code to the message app server 200.

Figure 15:
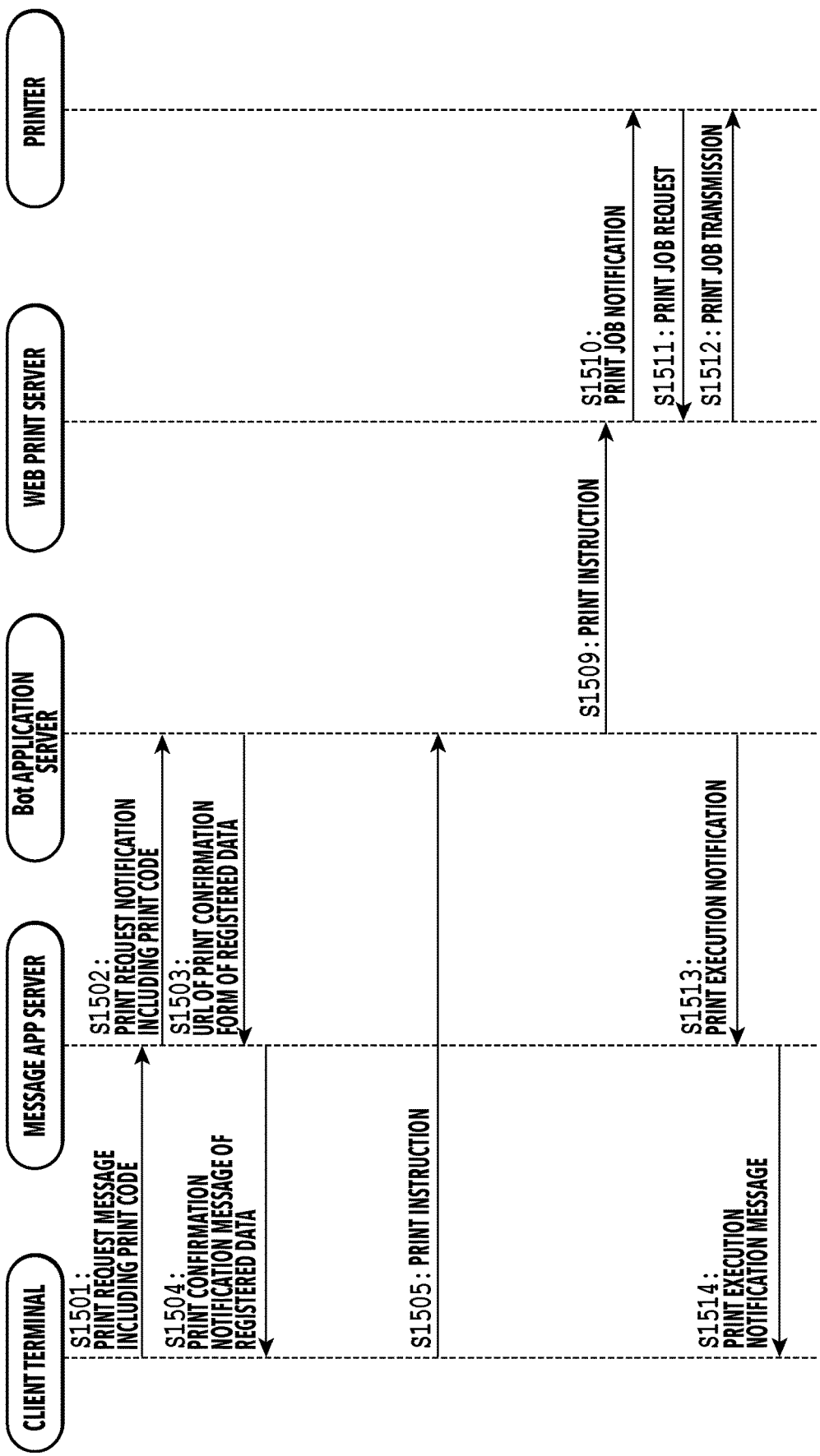
FIG. 15 is a sequence diagram illustrating print processing.

FIG. 15 is a sequence diagram illustrating print processing of performing printing by directly transmitting the print code to the message app server 200 according to the present embodiment.

Figure 16:
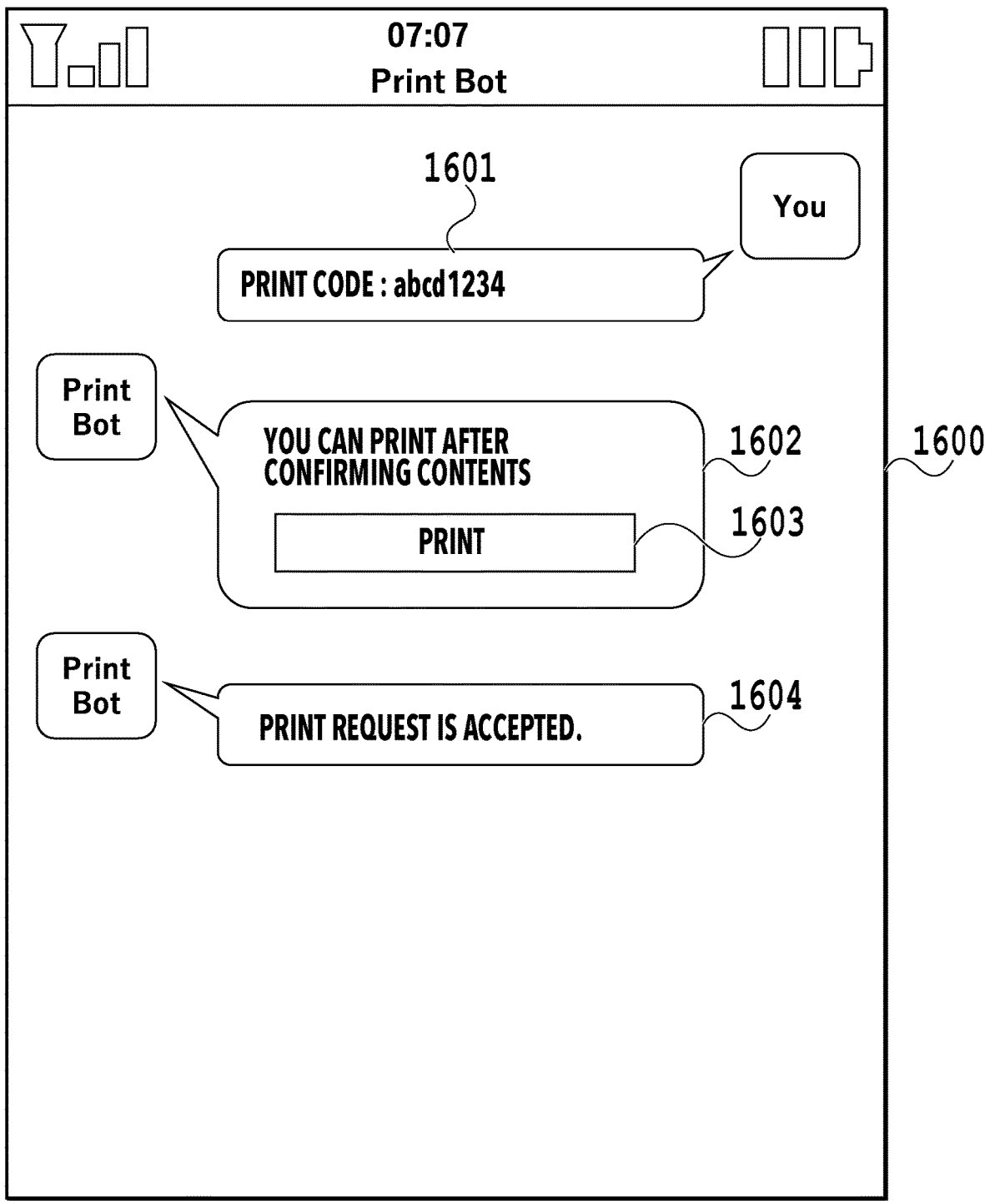
FIG. 16 is a diagram illustrating an example of the message talk screen.

FIG. 16 is a diagram illustrating an example of a message talk screen 1600 displayed on the display device 104 of the client terminal 100 in a case where the print data is printed by directly transmitting the print code to the message app server 200 according to the present embodiment.

In S1501, the client terminal 100 transmits a print request message 1601 including the print code to the message app server 200. The client terminal 100 can be a client terminal used at the registration of the file or can be a different client terminal. In other words, the user who transmits the print request message can be a user who is the same as the user who registers the file or can be a different user. A print request message is transmitted to the message talk screen 1600 by using a format or a URL scheme transmitted from the Web browser 111 to the message talk screen 1600 without an operation of the input device 105 by the user. In another exemplary embodiment, a print request message including the print code can be inputted to the input form of the message transmitted to the message talk screen 1600. In a case of using the URL scheme, a mode in which the print request message is shared with a third person via a social networking service (SNS) or the like is applicable and the print request message is inputted by the third person to which the print request message is shared. Using the URL scheme can enable the third person to omit inputting of the print code and implement the inputting of the print code with an easy procedure. In a case of sharing with a third person, the print code can be shared simply as well shared together with information to access various manuals and the like.

In S1502, the message app server 200, after receiving the print request message, transmits a print request notification including the print code to the Bot application 310. The print request notification including the print code includes the identification information identifying the user who transmits the message.

The Bot application 310, after receiving the print request notification including the print code, obtains the registered data corresponding to the print code from the database 320. Then, in S1503, the Bot application server 300 transmits a message including a URL to a form for print confirmation of the registered data to the message app server 200. In response to the message, the message app server 200 transmits a print confirmation notification message of the registered data to the message app 110 in S1504. In a case where the obtained print code is unavailable, the message app server 200 can transmit a message notifying of the unavailability.

The message app 110 displays a print confirmation notification message 1602 of the received registered data. With a URL 1603 included in the message being selected by a user operation, the Web browser 111 is activated, and the print setting screen 1004 illustrated in FIG. 10B is displayed on the Web browser 111. The URL can be displayed in any format including text, a button, or an image.

S1505 to S1514 in FIG. 15 is the same as S807 to S813 described in FIG. 8. As such, detailed descriptions are omitted herein.

As described above, according to the present embodiment, the transmission of the print request message including the print code enables omitting the input process by the user operation on the input form of the print code.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-137287, filed Aug. 25, 2021, which is hereby incorporated by reference wherein in its entirety.

What is claimed is:

1. A system, comprising:
a printer; and
a server system in which registration of print data to be printed by the printer is performed, wherein
the server system includes:
a reception unit configured to receive a first message, which is transmitted from a messaging application operating in a client terminal to request the registration of the print data, via a messaging application server,
a first transmission unit configured to, in response to the first message, transmit a uniform resource locater (URL) of a registration form of the print data to the messaging application via the messaging application server,
a registration unit configured to register the print data, which is transmitted by a browser operating in the client terminal by using the registration form, and
a second transmission unit configured to transmit a print code corresponding to the print data to the messaging application via the messaging application server,
wherein the printer executes printing based on the registered print data.

2. The system according to claim 1, wherein the print data transmitted by the browser by using the registration form is obtained by the server system without the messaging application server.

3. The system according to claim 1, wherein
the first message includes identification information on a user of the messaging application,
the URL includes information based on the identification information on the user,
the second transmission unit transmits the identification information on the user, which is obtained from the information included in the URL used for the registration, to the messaging application server with the print code, and the messaging application server, based on the identification information on the user, determines a messaging application to which the print code is transmitted, the print code being transmitted from the second transmission unit.

4. The system according to claim 1, wherein
the registration form is configured to set an item of print setting of the print data, and
the registration unit registers print setting that is set via the registration form in association with the print data.

5. The system according to claim 4, wherein
the registration form is configured to display, as an initial value, print setting of a printer associated with a user of the messaging application.

6. The system according to claim 1, wherein
the registration form is configured to display an error on the browser in a case where designated print data cannot be obtained.

7. The system according to claim 1, wherein
the registration form is configured to have a function of restricting a type of transmittable print data.

8. The system according to claim 7, wherein
the registration form is configured to cancel the function of restricting the type of the print data in a case where the function of the restriction cannot be implemented.

9. The system according to claim 1, wherein
the registration unit, in response to the registration of the print data, transmits a second message to the browser indicating that the print data is received,
the server system further includes a second reception unit configured to receive a third message indicating transmission completion that is transmitted by the browser to the messaging application server in response to the second message, and
the second transmission unit, in response to the reception of the third message, transmits the print code to the messaging application via the messaging application server.

10. A server system in which registration of print data to be printed by a printer is performed, the server system comprising:
a reception unit configured to receive a message, which is transmitted from a messaging application operating in a client terminal to request the registration of the print data, via a messaging application server;
a first transmission unit configured to, in response to the message, transmit a uniform resource locater (URL) of a registration form of the print data to the messaging application via the messaging application server;
a registration unit configured to register the print data, which is transmitted by a browser operating in the client terminal by using the registration form; and
a second transmission unit configured to transmit a print code corresponding to the print data to the messaging application via the messaging application server.

11. A method for controlling a server system in which registration of print data to be printed by a printer is performed, the method comprising:
receiving a message, which is transmitted from a messaging application operating in a client terminal to request the registration of the print data, via a messaging application server,
transmitting, in response to the message, a uniform resource locater (URL) of a registration form of the print data to the messaging application via the messaging application server,
registering the print data, which is transmitted by a browser operating in the client terminal by using the registration form, and
transmitting a print code corresponding to the print data to the messaging application via the messaging application server.

* * * * *